United States Patent [19]
Mueller et al.

[11] Patent Number: 5,931,492
[45] Date of Patent: Aug. 3, 1999

[54] AIRBAG APPARATUS

[75] Inventors: Frank Mueller, Wollbach; Gerhard Klingauf, Balzheim, both of Germany

[73] Assignee: Takata (Europe) Vehicle Safety Technology GmbH, Ulm, Germany

[21] Appl. No.: 09/089,486

[22] Filed: Jun. 2, 1998

[30] Foreign Application Priority Data

Jun. 6, 1997 [DE] Germany ............ 197 24 029

[51] Int. Cl.⁶ .................................. B60R 21/16
[52] U.S. Cl. ................. 280/728.2; 280/731; 200/61.55; 411/5; 411/42
[58] Field of Search ................. 280/728.2, 731, 280/728.1; 200/61.55; 411/3, 5, 39, 42

[56] References Cited

U.S. PATENT DOCUMENTS

| | | | |
|---|---|---|---|
| 3,078,064 | 2/1963 | Turnbull | 248/239 |
| 4,785,144 | 11/1988 | Fosnaugh et al. | 200/61.55 |
| 5,087,069 | 2/1992 | Corbett et al. | 280/728 |
| 5,199,834 | 4/1993 | Seidl et al. | 411/5 |
| 5,333,897 | 8/1994 | Landis et al. | 280/728 |
| 5,350,190 | 9/1994 | Szigethy | 280/728 |
| 5,380,037 | 1/1995 | Worrell et al. | 280/728 |
| 5,382,046 | 1/1995 | Cuevas | 280/728 |
| 5,584,501 | 12/1996 | Walters et al. | 280/728 |
| 5,590,900 | 1/1997 | Duran et al. | 280/728 |
| 5,624,130 | 4/1997 | Ricks | 280/728.2 |

FOREIGN PATENT DOCUMENTS

| | | |
|---|---|---|
| 07 54 603 A1 | 4/1987 | European Pat. Off. . |
| 07 54 602 A1 | 4/1994 | European Pat. Off. . |
| 07 54 601 A1 | 4/1997 | European Pat. Off. . |
| 39 08 000 A1 | 9/1990 | Germany . |
| 42 11 072 C2 | 3/1994 | Germany . |
| OS 22 42 981 | 3/1994 | Germany . |
| 43 26 554 A1 | 2/1995 | Germany . |
| 195 21 937 A1 | 12/1995 | Germany . |
| 195 22 313 A1 | 1/1996 | Germany . |
| 195 03 816 A1 | 8/1996 | Germany . |
| 196 02 828 A1 | 7/1997 | Germany . |
| 2270657 | 3/1997 | United Kingdom ............ 280/731 |

OTHER PUBLICATIONS

Patent Abstract of Japan, JP 09–30358, Apr. 16, 1996, Duran et al.

Patent Abstracts of Japan, JP 08–29693, Jul. 13, 1994, Nikon Corp.

Primary Examiner—J. J. Swann
Assistant Examiner—David R. Dunn
Attorney, Agent, or Firm—Foley & Lardner

[57] ABSTRACT

The invention relates to an airbag apparatus including a container (11) which can be broken open, the container having a base (12) to which there is secured a gas generator (13) and a gas bag (14) which is folded together and accommodated in the container, as well as an outwardly projecting attachment element (15) for the attachment of the container (11) to a vehicle steering wheel (16). In accordance with the invention, the design is such that the attachment element (15) includes a snap fastener (18) secured to the base (12) of the container (11) that can latch directly into an associated bore (17) of the steering wheel (16). The snap fastener has a position of intended separation, in particular a position of intended fracture, between the attachment position of the fastener (15) to the container (11) and the snap means (18). After separation at the position of intended separation or fracture or at the position of intended fracture (19), when the gas generator (13) is triggered, the snap fastener may be fixed by a holding element (20) with respect to its latched position at the edge of the bore (17).

19 Claims, 5 Drawing Sheets

AIRBAG APPARATUS

BACKGROUND OF THE INVENTION

1. Field of the Invention

The invention relates to an airbag apparatus particularly, one having a container having a base to which there is a gas generator secured. A folded airbag is secured and accommodated in the container. There is also a snap fastener secured to the bottom of the container and adapted for latching directly to a bore in the steering wheel. The container also has an intended point of separation.

2. Description of Related Art

One such airbag apparatus is known from EP 0 694 442 in which a air bag is centrally secured to the steering wheel of a motor vehicle so that the gas bag, which inflates after of the container breaks open when accident-dependent accelerations arise, is located in an ideal position relative to the driver. In general, the container containing the folded-together gas bag is secured in an axially resilient manner to the steering wheel with contact pairs between the gas bag container and the steering wheel permitting the current circuit for the horn to be closed on resilient depression of the container relative to the steering wheel. In this manner, the container of the gas bag can also serve as the actuating knob for the vehicle horn.

A problem with such airbag apparatuses lies in rapidly securing the gas bag container to the steering wheel in a manner which is, nevertheless, so reliable that there is no danger of a full release of the container from the steering wheel, even when the gas generator is removed.

SUMMARY OF THE INVENTION

The object of the invention is to provide an airbag apparatus of the initially named kind, which can be secured in the simplest manner to the vehicle steering wheel but which, nevertheless, precludes any danger of the airbag apparatus releasing from the vehicle steering wheel in the event the gas generator is triggered as a result of accident-dependent accelerations.

In order to satisfy this object, there is provided an airbag apparatus having a container having a basic to which there is a gas generator secured. A folded airbag is secured and accommodated in the container. There is also a snap fastener secured to the bottom of the container and adapted for latching directly to a bore in the steering wheel, the container also has an intended point of separation.

The concept underlying the invention is thus to be seen in the fact that the attachment of the container, which can be broken open and which contains the gas bag and the gas generator, has a snap fastener connection known per se in which the snap fastener is simply pushed sufficiently far into suitable bores, in particular in the spokes of the steering wheel, such that they come into a snap-fastening engagement with the steering wheel and are thus automatically latched against being pulled out. However, as the snap fasteners are resiliently yieldable as a result of their function, a certain danger exists that the snap fasteners will release despite their latching at the edge of the bore in the steering wheel when a high loading arises due to triggering of the gas generator,. This is prevented by the position of intended separation, in particular the position of intended fracture provided in accordance with the invention. The part of the snap fastener which remains in the bore of the steering wheel after the intended separation, then serves as an abutment for the holding means.

The connection of the gas bag container to the steering wheel preferably takes place in such a way that one bore for an associated fastener for the gas bag container is provided in each spoke of the steering wheel. In a three-spoke steering wheel, three attachment means in accordance with the invention are thus arranged at the base of the gas bag container and can in each case be snapped into an associated bore in a spoke of the steering wheel.

The design in accordance with one of the preferred embodiments allows the gas bag container, which can be attached directly in bores of the steering wheel without problem, to simultaneously be used as the horn a citation means.

For manufacturing reasons, and in order to ensure the required elasticity, a preferred embodiment the snap fastener of plastic includes. The manufacture of a plastic snap fastener has the further advantage that the steering wheel is electrically insulated from the metallic parts of the container, with it being possible to mount the horn contacts without regard to electrical insulation at the container or at the steering wheel.

The use of plastic, in particular in conjunction with the resetting spring, also avoids fluttering of the airbag arrangement at the steering wheel. The snap fastener sleeve in accordance with the invention also ensures a good linear guidance of the container at the steering wheel during the relative movement when honking the horn. The use of plastic also ensures that the airbag apparatus of the invention is not noisy and is service-free.

The snap fastener of the invention, in particular the snap fastener hooks, needs only be sufficiently firmly designed and shaped that it prevents the container from being pulled off from the steering wheel by chance or in an unauthorized manner, and in other respects in such a way that it can reliably withstand the resetting spring force. In contrast, on accident-dependent triggering of the gas generator, the holding pin, which only then comes into action for the first time, takes on the task of securing the container or the container base to the steering wheel so that no danger exists that the container with the inflated gas bag will move around within the passenger compartment in an uncontrolled manner.

The resetting spring provided between the container, or the snap fastener sleeve, and the steering wheel has a double function in as much as it, on the one hand, brings the snap fastening means, in particular the snap fastening hooks, into rattle-free engagement with the rim of the bore of the steering wheel, and, on the other hand, permits the operation of the gas bag container as a horn actuating knob.

The spreading element, which ensures the fixation of the snap fastener means in the latched position, in one preferred embodiment is manufactured of metal.

BRIEF DESCRIPTION OF THE DRAWINGS

The invention will be described in the following by way of example and with reference to the drawings, in which are shown.

DETAILED DESCRIPTION OF THE PREFERRED EMBODIMENTS

Figure 1:
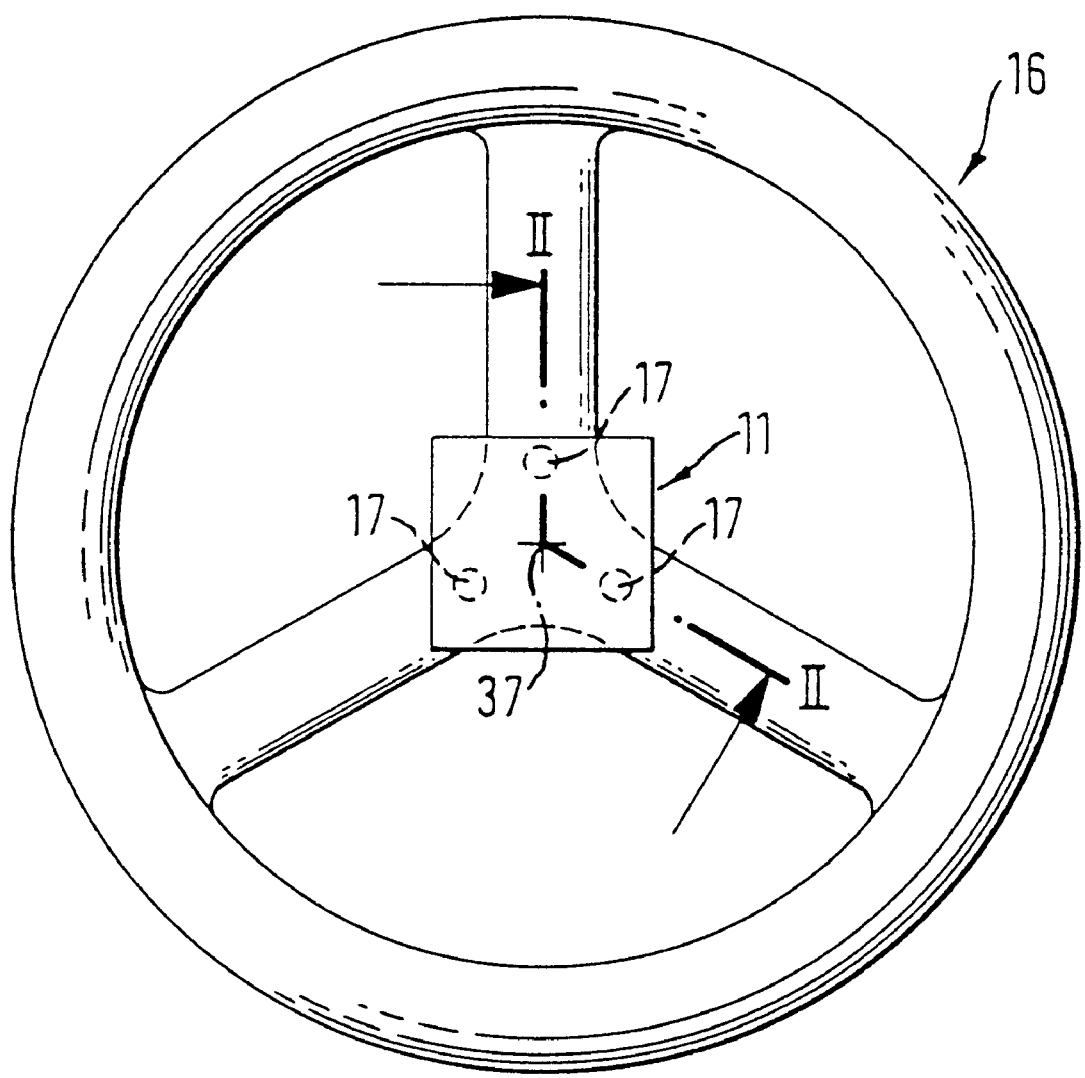
FIG. 1 a schematic plan view of a vehicle steering wheel with an airbag apparatus in accordance with the invention arranged thereon, FIG. 2 an enlarged schematic side view on the line II—II in FIG. 1, FIG. 3 an enlarged section of a sectional view of an airbag apparatus in accordance with the invention in the region of the attachment to a spoke of a steering wheel, FIG. 4 a similar sectional view of a further embodiment, FIG. 5 a schematic sectioned side view of an airbag apparatus in accordance with the invention in the region of one of several fastener means prior to the installation in a vehicle, FIG. 6 a corresponding sectional side view of the airbag apparatus of FIG. 5 after being snapped into a spoke of a steering wheel, and FIG. 7 a sectioned schematic side view analogous to FIGS. 5 and 6 after the triggering of the gas generator and the rupture of the position of intended fracture in accordance with the invention which has thereby taken place.
Figure 2:
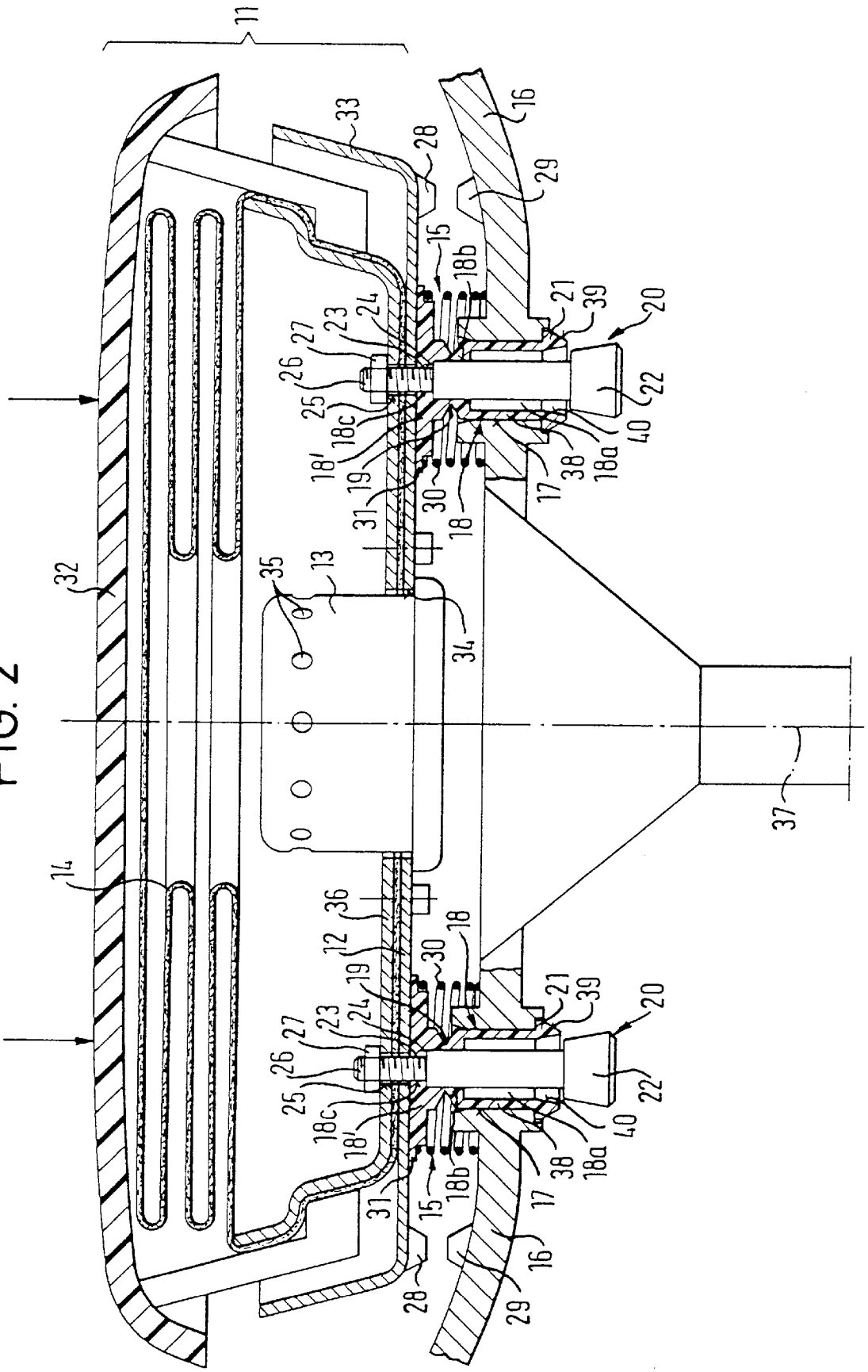
Figure 3:
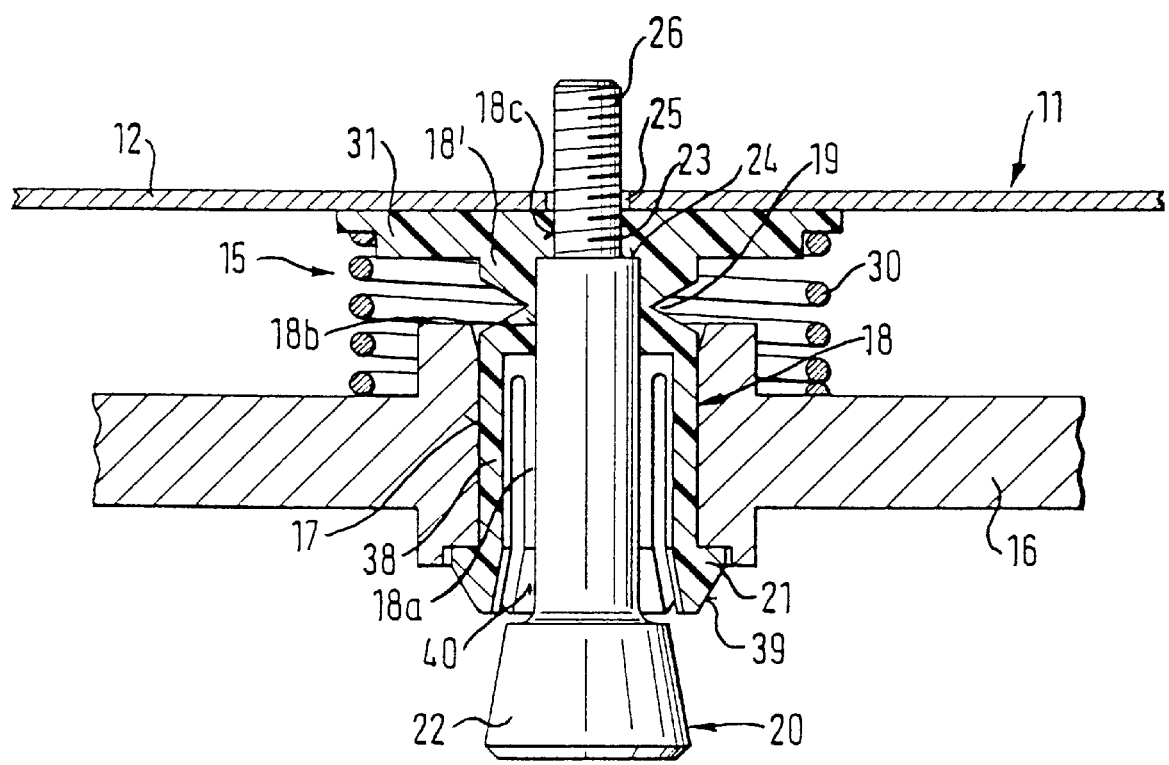

In accordance with the FIGS. 1 to 3, a container 11 including, for example, plastic and having a cover 32, which can be broken open, has a base 12 which is formed on a trough-like sheet metal part 33. A gas generator 13 is secured in a central bore 34 of the sheet metal part 33 and on being triggered, in the case of accident-dependent accelerations of the vehicle, permits gas to flow out through gas outlet openings 35. This gas inflates a gas bag 14 accommodated in a folded together state in the interior of the container 11 after the breaking open of the cover 32 for the protection of the driver. The gas bag 14 has a central opening in a peripheral region which is, for example, clamped to the trough-like sheet metal part 35 by means of a sheet metal counterpart 36 so that the inner space of the gas bag 14, which stands in flow connection with the gas outlet opening 35, is largely sealed off towards the outside, apart from the non-illustrated outflow openings.

In accordance with FIG. 1, the steering wheel 16 has three spokes. Bores or bores with running ramps, 17 are provided in each spoke close to the central axis 37. A fastener or attachment means 15 is attached to the base 12 of the container 11 and is engaged into the bores with a snap-fitted engagement.

The fastening element 15 includes a snap fastener sleeve 18 having a ring-flange flange 31 at its end confronting the base 12 and a ring arrangement axially extending spring arms 38 in the end region remote from the ring flange 31. The free ends of the spring arms 38 carry radially outwardly pointing snap-fitting hooks 21 which are respectively provided with radially outer run-in ramps 39. A position of intended fracture 19 formed as a ring groove is located between the upper part 18' of the snap fastener sleeve 18 which adjoins the ring flange 31, and the part which carries the spring arms 38 and the snap fastener hooks 21.

The central bore of the snap fastener sleeve 18 has three regions, a larger diameter region 18a, which extends in the vicinity of the spring arms 38 and permits resilient inward deflection of the spring arms 38, a central guidance region 18b of smaller diameter for a central holding pin 20a including metal, and a further tapered end region 18c, which follows an inwardly projecting ring step. An attachment spigot or fastening spigot 26, provided following a corresponding ring step 24 in the end attachment region 23 of the holding pin 20, engages into the end region 18c. The attachment spigots 26 have an outer thread in the described embodiment and extend through bores 25 in the base 12 of the container into the interior of the container 11, where nuts 27 are screwed on for the purpose of attaching the snap fastener sleeve 18 to the base 12.

In the larger diameter region 18a, the holding pin 20 has a spacing from the resilient arms 38 with the snap fastening hooks 21 on all sides such that the resilient arms 38 can be resiliently deflected radially inwardly to a sufficient degree. In accordance with the invention the holding pin 20 has, at its end remote from the attachment spigot 26, a head 22 which that tapers towards the snap fastener sleeve 18 and cooperates with inclined surfaces 40 at the radially inwardly disposed sides of the snap fastening hooks 21.

The snap fastening hooks 21 contact the lower edges of the bores 17 in FIGS. 2 and 3 in such a way that the container 11 is secured to the steering wheel. This contact is ensured in that a compression coil spring 30 is provided between the flange 31 of the snap fastening sleeve 18 and the surface of the spoke of the steering wheel 16 facing the container 11 and keeps the container 11 and the steering wheel 16 at a separation determined by the snap fastening hooks 21.

Mutually insulated contacts 28 and 29 respectively are secured in the vicinity of each snap fastening sleeve 18 to the base 12 of the container 11 and to the spokes of the steering wheel 16 respectively, as can be seen in FIG. 2. I.e., the mutually insulated contacts 28 and 29 have a separation from one another in the position of FIG. 2 but can enter into engagement on pressing the container 11 in the direction of the arrow in FIG. 2, with the spring 30 being compressed, and with the snap fastening hooks 21 lifting off from the associated retaining surface at the steering wheel 16. This movement can be exploited to close a horn current circuit.

Figure 5:
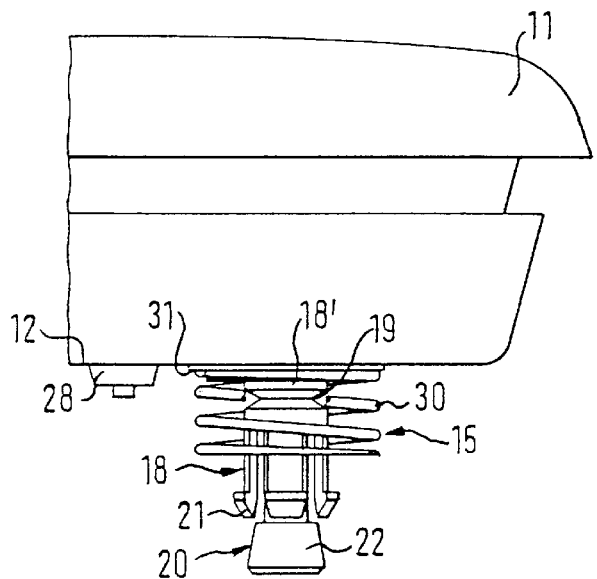
Figure 6:
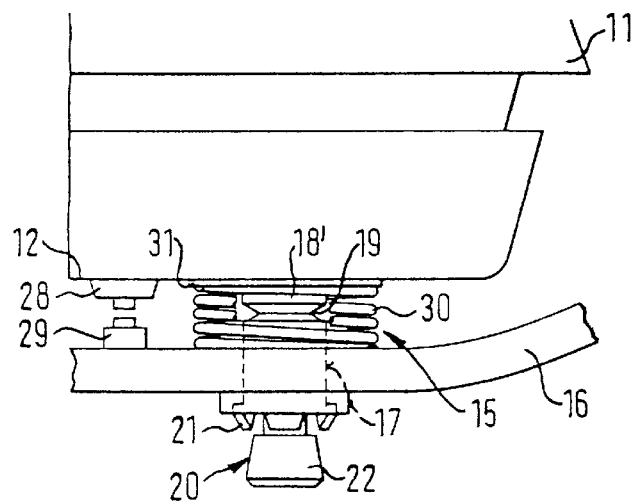

The operation of the airbag apparatus described with reference to FIGS. 1 to 3 is as follows:

First of all, the airbag apparatus including the snap fastener sleeves 18 and the holding pins 20 is pre-assembled, whereupon it has the appearance of FIG. 5. All components of the airbag apparatus are non-loosably arranged, i.e. they form a complete pre-assembled module, which can be handled as a unit prior to snap-fitting to the steering wheel and also thereafter. In this state, the snap fastening sleeves 18 are pressed from above into the correspondingly provided bores 17 of the spokes of the steering wheel 16, with the run-in ramps 39 sliding along the run-in ramps of the bores 17 and thereby pressing the resilient arms 38 radially inwardly until the snap fastening hooks 21 pass through the bores 17. The snap fastening sleeves 18 are now pushed into the bores 17 sufficiently far until the snap fastening hooks 21 can engage behind the lower rim of the bores 17 in FIGS. 2, 3 and 6 and can be transferred into this position by their inherent spring action. In this way the contact pairs 28, 29 automatically come into the relative position which can be seen from FIGS. 2 and 6, in which they lie opposite to one another with a spacing.

The airbag apparatus with the container 11 can thus be secured to the steering wheel 16 in the simplest manner.

Figure 7:
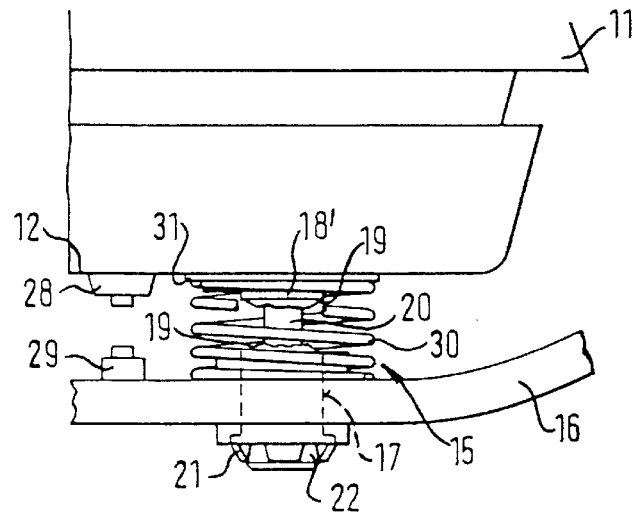

Should now the gas generator 13 be triggered, on the occurrence of an accident-dependent acceleration, then the cover 32 of the container 11 is broken open and the gas bag 14 is inflated with an abrupt loading of the base 12 taking place away from the steering column 16. The positions of intended fracture 19 dimensioned in accordance with the invention such that they break as a result of this abrupt loading before the snap fastening hooks 21 can release from their latched position in accordance with FIGS. 2 and 6. The upper part 18' of the snap fastening sleeve 18 can now move, together with the container 11 and the base 12, separate from the part carrying the snap fastening hooks 21 and in the direction of the arrow away from the steering wheel 16 in accordance with FIG. 7, with the holding pin 20 being moved with it. The conical head 22 of the holding pin 20 finally comes into contact against the radially inner inclined surface 40 of the snap fastening hooks 21, and thus makes radially inward resilient deflection of the spring elements 38 impossible. At the same time, a problem-free axial support for the holding pin 20 is provided as a result of the spring elements 38 being pressed radially outwardly at the periphery of the bore 17, whereby, in accordance with FIG. 7, a further separation of the base 12 of the container 11 from the steering wheel 16 during inflation of the gas bag 14 is made impossible. The movement of the container 11 or of the gas bag 14 with the base 12 away from the steering wheel 16 is thus restricted by the contact of the head 22 against the inclined surfaces 40 of the snap fastening hooks 21.

In the following embodiment, the same reference numerals are used to designate the same components, as in the embodiment of FIGS. 1 to 3 and 5 to 7.

Figure 4:
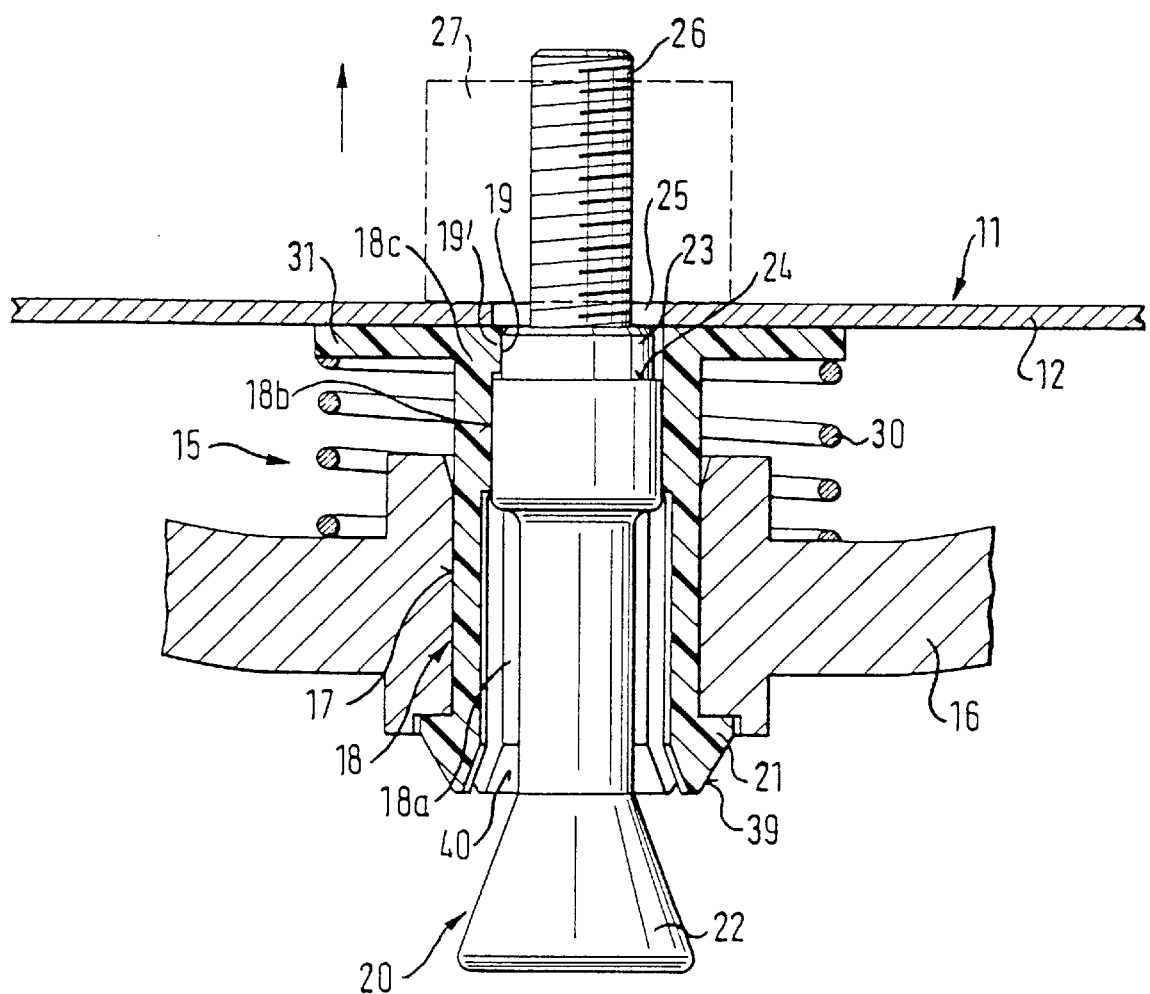

In distinction to the previously described embodiment, the position of intended fracture 19 in the embodiment of FIG. 4 is realized in that radially inwardly directed axial ribs 19' are distributed around the periphery in the end region 18*c* of the snap fastening sleeve 18, and cooperate with the ring step 24 of the holding pin 20 in such a way that the axial holding force of the fastening spigot 26 is transferred via the ring step 24 and the ribs 19' to the snap fastening sleeve 18. The ribs 19' are, however, made so weak in accordance with the invention that upon axial loading in the direction of the arrow in FIG. 7, such as occurs during triggering of the gas generator 13, the ribs are sheared off from the snap fastening sleeve 18. In this way, the holding pin 20 together with the container 11 and its base 12 move upwardly until the head 22 contacts the inclined surfaces 40, and thus a further movement of the holding pin 20 is prevented.

Even though a complementary design of the head 22 and of the inclined surfaces 40 of the snap fastening hooks 21 is preferred, because in this way a particularly large contact surface is ensured, it would also suffice if only one of the mutually cooperating surfaces tapers in wedge-like manner, whereas the other is formed solely as a corresponding sliding edge, which can slide along the tapering counterpiece. Fundamentally, it is also possible for both the receiving opening between the snap fastening hooks 21 and also the head 22 to be circularly cylindrical, with the head 22 then contacting a radially inwardly directed ring step or radially inner projections at the snap fastening hooks 21 or spring arms 38 after the gas generator 13 has been triggered and the position of intended fracture 19 has ruptured. It is important that the head 22 has smaller diameter than the bore 17 so that it can pass without problem through the bore 17 when the airbag apparatus is snapped into place onto the steering wheel. Furthermore, the diameter of the holding pin 20 must be such designed that it does not prevent the resilient inward deflection of the spring element 38 and of the snap fastening hooks 21.

We claim:

1. An airbag apparatus comprising:
   a container having a base;
   gas generator secured to the base;
   a gas bag folded together and accommodated in the containers; and
   an attachment element for attaching the container to a vehicle steering wheel,
   wherein the attachment element includes a snap fastener secured to the base of the container, the snap fastener being adapted to latch directly into an associated bore of the steering wheel and having a position of intended separation, between the attachment position of the attachment element to the container and the snap fastener, and wherein the snap fastener, after separation at the position of intended separation, when the gas generator is triggered, is fixed by a holding element with respect to its latched position at a edge of the bore.

2. An airbag apparatus in accordance with claim 1, wherein the snap fastener includes a snap fastener sleeve which is secured at one side via the position of intended separation to the container and has snap fastener hooks at the side remote from the container, wherein the snap fastener hooks are radially resiliently deflectable, and
   wherein, upon being inserted into the bore of the steering wheel, the snap fastener hooks are deflected radially inwardly to such an extent that the snap fastener sleeve is pushed into the bore by an amount such that the snap fastener hooks snap behind the edge of the bore of the steering wheel remote from the container.

3. An airbag apparatus in accordance with claim 1 wherein the holding element includes a holding pin with an enlarged head, wherein the diameter of the enlarged head is smaller than the associated bore in the steering wheel and wherein the enlarged head, after release of the gas generator is moved between the snap fastener and is held there.

4. An airbag apparatus in accordance with claim 3, wherein the holding pin, at its attachment region which is remote from the enlarged head, attaches the snap fastener to the container, with the position of intended separation being located between the part of the snap fastener secured in the attachment region of the holding pin to the container and the part of the snap fastener that carries the-snap fastener hooks.

5. An airbag apparatus in accordance with claim 4, wherein the holding pin further includes a ring step in its attachment region for tensionally fixedly connecting the holding pin in a manner resistant to extension to the part of the snap fastener adjacent the container.

6. An airbag apparatus in accordance with claim 4, wherein the attachment region of the holding pin has an attachment spigot extending through bores in the container and is secured to the base of the container.

7. An airbag apparatus in accordance with claim 3, wherein the enlarged head of the holding pin diverges, in the direction away from the container and cooperates with corresponding inclined surfaces of the-snap fastener hooks provided at the snap fastener means in such a way that, upon entry of the enlarged head into the space between the snap fasteners hooks the snap fastener hooks are pressed radially outwardly against the edge of the bore and the holding pin is fixed.

8. An airbag apparatus in accordance with claim 1, wherein the position of intended separations comprises a ring groove.

9. An airbag apparatus in accordance with claim 1, wherein the snap fastener includes a snap fastener sleeve, wherein the position of intended separation comprises ribs adapted to be sheared off and wherein the ribs are provided at an inner wall of the snap fastener sleeve.

10. An airbag apparatus in accordance with claim 2, wherein a pre-stressed spring is arranged between the end of the snap fastener sleeve adjacent the container and the region of the steering wheel surrounding the bore and are adapted to press the snap fastener hooks axially against the edge of the bore in the direction of the container.

11. An airbag apparatus in accordance with claim 10 wherein the snag fastener sleeve includes a flange at an end thereof adjacent to the container and for supporting the spring adjacent the container.

12. An airbag apparatus in accordance with claim 10 further comprising at least one contact pair between the container and the steering wheel and connected to and normally electrically insulated with respect to a current circuit for the vehicle horn, wherein the contact pair is electrically conductive when the container is pressed in the direction of the steering wheel against the force of the spring and thereby closes the current circuit for the horn.

13. An airbag apparatus in accordance with claim 1, wherein the snap fastener comprises plastic.

14. An airbag apparatus in accordance with claim 1, wherein the holding element comprises metal.

15. An airbag apparatus in accordance with claim 3, wherein the holding element further includes wedge-like tapering openings for holding the enlarged head between the snap fastener.

16. An airbag apparatus in accordance with claim 3, wherein the holding element further includes steps for holding the enlarged head between the snap fastener.

17. An airbag apparatus in accordance with claim 3, wherein the holding element further includes projections for holding the enlarged head between the snap fastener.

18. An airbag apparatus in accordance with claim 1, wherein the position of intended separation comprises a peripherally extending, continuous step which releases the holding pin at a predetermined loading.

19. An airbag apparatus in accordance with claim 1, wherein the position of intended separation comprises a peripherally extending, interrupted step which releases the holding pin at a predetermined loading.

* * * * *